106-90

4/81,902

United States Patent Office 3,432,316
Patented Mar. 11, 1969

3,432,316
HYDRAULIC CEMENT MIX AND ADDITIVE
Thomas M. Kelly, Chagrin Falls, Richard B. Peppler, Cleveland Heights, and James A. Ray, Streetsboro, Ohio, assignors to Martin-Marietta Corporation, a corporation of Maryland
No Drawing. Filed Aug. 23, 1965, Ser. No. 481,902
U.S. Cl. 106—90         11 Claims
Int. Cl. C04b 7/12, 7/00

ABSTRACT OF THE DISCLOSURE

A hydraulic cement mix which includes portland cement, aggregate and sufficient water to effect hydraulic setting of the cement as well as an additive. The additive comprises a portion of the tobacco plant and this portion of the tobacco plant may take many forms which includes the aqueous extraction product of the tobacco plant alone or along with the insoluble material resulting from this treatment. A comminuted portion of the cured tobacco plant may also be used.

---

This invenion relates in general to hydraulic cement mixes, for example, portland cement concretes and mortars, and dry mixes for making such concretes and mortars, and to the additives for obtaining these mixes.

It is known in the art that several materials will beneficiate concrete or mortar when employed as small percentage additions to the plastic mixes. For example, spent sulfite liquor from the pulp and paper industry is known in this respect. However, a disadvantage of such materials, when they are employed in a practical and economical dosage range, is that they effect a greater degree of retardation of the rate of hardening of the concrete or mortar than is desired. This circumstance has led to the use of accelerators, such as calcium chloride in combination with such agents to control this undesirable retardation.

It is an object of this invention to provide a material to be used as a hydraulic cement additive which not only reduces the required water content of a cement mix for a given plasticity, and increases the strength of the concrete produced, but which has a lesser degree of retardation of the rate of hardening of the hydraulic cement mix as well as providing a somewhat greater degree of air entrainment when desired than is provided by many additives presently in commercial use.

Another object of this invention is to provide a novel concrete or mortar mix having improved characteristics.

Another object of this invention is the provision of a novel additive for concrete and mortar to improve the characteristics thereof.

Another object is the provision of a superior additive for concrete and mortar producing results not hitherto obtainable.

The preferred source of the additive of the present invention is the tobacco plant which after harvesting, has undergone weathering or any of various types of curing known in the art. There is a notable lack of consistency in the use of the term "curing" but it usually refers to the regulated drying of harvested portions of the tobacco plant. However, curing usually means more than merely drying, but is a drying procedure conducted under such conditions of temperature, humidity, and air supply as will permit certain changes in chemical composition to take place which are essential to the development of the desired quality of the plant material for normal commercial use. While the curing of the leaf is the primary object of this operation, the stems are also cured when the leaf as such is harvested and both the stalks and the stems are cured when the entire stalk with attached leaves is harvested. Any portion of the tobacco plant such as stalk, stem, or leaves is an adequate source of the additive, or may of itself comprise the additive. While a useful additive might be secured from any portion of the tobacco plant at virtually any stage of development or condition thereof, the preferred source is stalks, stems, or leaves that have undergone curing, either naturally or artificially.

Of the many vegetative extracts or products known in the prior art the tobacco plant and extracts thereof have unique and unexpected properties and effects in concrete and mortar mixes. The principal effect of this nature is that an acceleration of the rate of setting is effected by the tobacco plant material alone, without the addition of any other material. Oher beneficial effects such as reduction of water required to achieve a given degree of consistency and improvement to compressive strength of the resulting hardened mixes might be anticipated in a qualitative sense by inference from known effects of other vegetative materials, but in the present invention the degree or level of beneficiation of this kind achieved with use of small dosages of both extracts of, or with untreated, tobacco plant material is unexpected and would not be anticipated.

The present invention comprises the tobacco plant itself or portions thereof and the class of extractives of the tobacco plant which are soluble in aqueous systems, whether alkaline, neutral, or acidic, and which will produce in concrete or mortar the desirable effects defined and illustrated below. While it is obvious that the chemical composition of the extracts will vary in detail with varying conditions of extraction, these chemical compositions are so complex as to defy a completely definitive analysis. Consequently, the material of the present invention is best defined in terms of the effects it will produce in concrete and mortar.

Extracts of the tobacco plant materials may be made by stirring together the plant material with water or with an aqueous solution of an acid or alkali or other soluble material and filtering or otherwise removing from the resulting mixture, the insoluble plant material. The plant material to be extracted is preferably ground so as to increase its surface area and make the extraction more efficient, but similar extracts having similar properties are obtained if the plant material is not ground at all. Similarly, grinding of the plant material is rendered more efficient if it is previously dried, but prior drying of the plant material is only desirable and not necessary to the present invention. Under the mildest conditions of extraction, portions of the tobacco plant may simply be stirred with water at room or ambient temperature in an open vessel. At conditions of intermediate severity of extraction, as for example, heating the plant material and water or aqueous solutions at the boiling point of the latter, a convenient means is a vessel equipped with a reflux condenser, so that the extraction may be conducted without loss of the liquid phase. More severe conditions of extraction which employ temperatures ranging upward to 180° C. or higher require use of a closed-system reactor, preferably with provision for continuous stirring and instrumentation to monitor pressure and temperature. If other than neutral water is used in the extraction the desired pH may be attained by prior addition of common and economical acids, such as sulfuric, hydrochloric, or nitric, or a common and economical alkali, such as sodium hydroxide. Any of a wide range of concentrations of these agents may be used but about 1 percent or less by weight is preferred since no advantage is gained by using higher concentrations. Any of a wide variety of initial ratios of tobacco plant material to aqueous phase may be used but a weight ratio of from 5 to 35 percent of plant to liquid gives products having greatest ease of filtering if an extract is desired, or of incorporation into a concrete mix if it is desired to use the whole product without filtering.

Whether the filtrate or the total product is to be used in concrete the concentration of soluble matter in the liquid will depend on the concentration of the initial slurry and the temperature of extraction. Typically, for a 10 percent initial slurry of the plant material 1 to 4 percent by weight solubles would result in the liquid phase. When the filtered extract is to be used, it is convenient to add this solution as part of the normal mix water required by the concrete, so that no previous evaporation or concentration is required. However, if the extracts are concentrated to any desired degree prior to introduction into a concrete mix, the same effects are secured by all dosages which are equivalent with respect to weight of solute, regardless of volume or concentration of the extract.

For the purpose of illustrating the teachings and advantages of the present invention, plain concrete mixes were prepared and compared in several groups or series with similar concrete mixes to which had been added increasing amounts or dosages of aqueous extracts of the stems of the flue-cured bright leaf variety of the tobacco plant.

In all similar concrete mixes, the same type and brand of cement was used, and the proportion and kind of coarse and fine aggregate were substantially the same. A sufficient amount of water was added to each mix to effect hydraulic setting of the cement and to produce concrete mixes of essentially the same consistency, as measured by the slump cone. The results are shown below in Table No. 1.

TABLE 1

| Mix No. | Additive | Percentage addition of additive [1] | Temp. of extraction, °C. | Water, gal./cu. yd. of concrete | Air, vol. percent of concrete | Compressive strength of Concrete, p.s.i. | | Rate of hardening relative to plain mix, hrs.[2] |
|---|---|---|---|---|---|---|---|---|
| | | | | | | 7-day | 28-day | |
| 1 | None | | | 36.7 | 2.0 | 2,625 | 4,510 | |
| 2 | Water extract of stems | .05 | 25 | 33.5 | 3.1 | 3,220 | 5,165 | −¼ |
| 3 | do | .10 | 25 | 32.5 | 4.3 | 3,345 | 5,310 | 0 |
| 4 | None | | | 36.6 | 2.0 | 2,420 | 4,450 | |
| 5 | Water extract of stems | .025 | 120 | 34.5 | 2.6 | 3,090 | 5,035 | −¼ |
| 6 | do | .05 | 120 | 33.3 | 3.3 | 3,090 | 5,110 | 0 |
| 7 | do | .10 | 120 | 32.4 | 4.6 | 3,380 | 5,310 | 0 |
| 8 | do | .20 | 120 | 30.7 | 5.9 | 3,700 | 5,530 | +2 |
| 9 | None | | | 36.9 | 2.2 | 2,635 | 4,485 | |
| 10 | Water extract of stems | .05 | 150 | 34.2 | 3.2 | 3,070 | 4,989 | −¾ |
| 11 | do | .10 | 150 | 33.0 | 4.4 | 3,230 | 5,035 | −½ |
| 12 | do | .20 | 150 | 30.9 | 6.3 | 3,450 | 5,185 | +½ |
| 13 | None | | | 37.7 | 2.2 | 2,745 | 4,455 | |
| 14 | Water extract of stems | .025 | 180 | 35.7 | 2.7 | 3,055 | 4,715 | −¼ |
| 15 | do | .05 | 180 | 34.9 | 3.4 | 3,215 | 4,990 | 0 |
| 16 | do | .15 | 180 | 31.8 | 6.8 | 3,330 | 4,970 | +⅝ |

[1] Solids by weight of cement.
[2] A plus value indicates retardation; a minus value, acceleration.

It is apparent from the above data that this example of this invention employed as indicated, effects some air entrainment, significant water reduction, and improvements to compressive strength of the concrete while the rate of hardening thereof is nowhere excessively retarded, and typically, is accelerated.

Similar extracts were made of Burley, air-cured tobacco stems and these were evaluated in concrete in a similar manner, with results as follows:

TABLE 2

| Mix No. | Additive | Percentage addition of additive [1] | Temp. of extraction, °C. | Water, gal./cu. yd. of concrete | Air, vol. percent of concrete | Compressive strength of Concrete, p.s.i. | | Rate of hardening relative to plain mix, hrs.[2] |
|---|---|---|---|---|---|---|---|---|
| | | | | | | 7-day | 28-day | |
| 17 | None | | | 36.7 | 2.0 | 2,625 | 4,510 | |
| 18 | Water extract of stems | .05 | 25 | 33.3 | 3.4 | 3,100 | 4,955 | −¼ |
| 19 | do | .10 | 25 | 32.6 | 4.4 | 3,400 | 5,190 | −½ |
| 20 | None | | | 36.3 | 2.0 | 2,630 | 4,415 | |
| 21 | Water extract of stems | .05 | 120 | 33.9 | 3.4 | 3,025 | 4,920 | 0 |
| 22 | do | .10 | 120 | 32.6 | 4.7 | 3,105 | 5,010 | 0 |
| 23 | do | .15 | 120 | 31.6 | 5.5 | 3,275 | 5,120 | −¼ |
| 24 | do | .25 | 120 | 30.5 | 6.5 | 3,380 | 5,145 | +¼ |
| 25 | None | | | 37.3 | 2.0 | 2,690 | 4,505 | |
| 26 | Water extract of stems | .05 | 150 | 34.7 | 3.2 | 3,145 | 5,020 | −½ |
| 27 | do | .075 | 150 | 34.4 | 3.7 | 3,195 | 4,945 | −¾ |
| 28 | do | .25 | 150 | 29.5 | 7.4 | 3,455 | 4,945 | +¼ |

[1] Solids by weight of cement.
[2] A plus value indicates retardation; a negative value, acceleration.

Together, the two tables of data above illustrate that similar beneficial effects in concrete are secured with use of extracts made over a wide temperature range of stems of either of the two principal types of tobacco, namely flue-cured bright leaf, or air-cured Burley.

Of the various possible agents which could be used to extract portions of tobacco plants, water is the most attractive from an economic point of view. However, a variety of other agents may be employed in making extractions to tobacco stems over a wide temperature range, as illustrated below. Extracts made with these agents employed in the dosages indicated in Table 3 were incorporated into concrete with no further treatment such as neutralization or extraction of excess agent or other changes. These experiments were made with the same brand of cement and the same type of aggregates and under the same conditions as those described above.

TABLE 3

| Mix No. | Additive | Percentage addition of additive [1] | Temp. of extraction, °C. | Water, gal./cu. yd. of concrete | Air, vol. percent of concrete | Compressive strength of Concrete, p.s.i. 7-day | Compressive strength of Concrete, p.s.i. 28-day | Rate of hardening relative to plain mix, hrs.[2] |
|---|---|---|---|---|---|---|---|---|
| 29 | None | | | 38.2 | 2.1 | 2,480 | 4,100 | |
| 30 | 1% nitric acid extract of burley stems | .05 | 25 | 34.8 | 3.8 | 2,820 | 4,470 | −¼ |
| 31 | do | .10 | 25 | 33.6 | 5.2 | 3,035 | 4,660 | −¼ |
| 32 | 1% nitric acid extract of bright leaf stems | .05 | 25 | 34.8 | 3.3 | 3,010 | 4,730 | −¼ |
| 33 | do | .10 | 25 | 33.7 | 4.2 | 3,215 | 4,910 | 0 |
| 34 | None | | | 38.6 | 2.1 | 2,375 | 4,155 | |
| 35 | 1% nitric acid extract of burley stems | .05 | 120 | 35.8 | 3.6 | 2,720 | 4,435 | −½ |
| 36 | do | .10 | 120 | 33.8 | 4.3 | 2,920 | 4,575 | −½ |
| 37 | 1% nitric acid extract of bright leaf stems | .05 | 120 | 35.9 | 3.5 | 2,850 | 4,645 | −½ |
| 38 | do | .10 | 120 | 34.2 | 4.9 | 3,100 | 4,840 | 0 |
| 39 | None | | | 36.3 | 2.1 | 2,580 | 4,590 | |
| 40 | 1% sulfuric acid extract of bright leaf stems | .05 | 100 | 33.3 | 3.8 | 3,250 | 5,280 | −½ |
| 41 | do | .10 | 100 | 32.1 | 5.1 | 3,335 | 5,300 | 0 |
| 42 | None | | | 37.9 | 2.2 | 2,345 | 4,070 | |
| 43 | 1% sulfuric acid extract of bright leaf stems | .05 | 150 | 35.5 | 3.2 | 2,670 | 4,560 | 0 |
| 44 | do | .075 | 150 | 35.0 | 3.5 | 2,765 | 4,740 | −¼ |
| 45 | do | .05 | 180 | 35.0 | 3.6 | 2,695 | 4,610 | −½ |
| 46 | do | .10 | 180 | 33.2 | 5.3 | 2,895 | 4,680 | 0 |
| 47 | None | | | 36.1 | 2.1 | 2,775 | 4,555 | |
| 48 | 1% hydrochloric acid extract of burley stems | .05 | 100 | 33.1 | 3.5 | 3,125 | 5,310 | −¾ |
| 49 | do | .10 | 100 | 32.3 | 4.4 | 3,225 | 5,140 | −½ |
| 50 | None | | | 36.4 | 2.2 | 2,575 | 4,685 | |
| 51 | 1% hydrochloric acid extract of bright leaf stems | .05 | 100 | 33.9 | 3.3 | 3,250 | 5,215 | −½ |
| 52 | do | .15 | 100 | 32.6 | 4.4 | 3,400 | 5,465 | +⅛ |
| 53 | None | | | 35.9 | 2.1 | 2,765 | 4,610 | |
| 54 | 5% hydrochloric acid extract of burley | .05 | 100 | 33.3 | 3.2 | 3,340 | 5,150 | −¼ |
| 55 | do | .10 | 100 | 32.7 | 4.1 | 3,220 | 5,150 | −¼ |
| 56 | None | | | 36.1 | 2.1 | 2,750 | 4,560 | |
| 57 | 5% hydrochloric acid extract of bright leaf stems | .05 | 100 | 34.0 | 3.0 | 3,145 | 5,095 | −¼ |
| 58 | do | .10 | 100 | 31.8 | 4.0 | 3,445 | 5,280 | −¼ |
| 59 | None | | | 35.5 | 2.0 | 2,535 | 4,565 | |
| 60 | 5% sodium hydroxide extract of bright leaf stems | .05 | 25 | 32.9 | 3.4 | 3,210 | 5,110 | −⅛ |
| 61 | do | .10 | 25 | 31.3 | 4.5 | 3,345 | 5,355 | −⅛ |
| 62 | None | | | 36.0 | 2.1 | 2,695 | 4,550 | |
| 63 | 1.2% sodium hydroxide extract of bright leaf stems | .05 | 25 | 33.2 | 3.6 | 3,220 | 5,155 | −½ |
| 64 | do | .10 | 25 | 31.9 | 4.9 | 3,450 | 5,385 | +¼ |
| 65 | 2% sodium hydroxide extract of burley stems | .05 | 25 | 34.2 | 3.3 | 2,995 | 4,890 | 0 |
| 66 | do | .10 | 25 | 32.7 | 4.7 | 3,160 | 5,010 | −¼ |
| 67 | None | | | 36.3 | 2.2 | 2,720 | 4,715 | |
| 68 | .15% sodium hydroxide extract of burley stems | .05 | 120 | 34.2 | 3.3 | 2,925 | 4,855 | 0 |
| 69 | do | .10 | 120 | 32.6 | 4.9 | 3,160 | 5,135 | 0 |
| 70 | None | | | 35.8 | 2.2 | 2,610 | 4,750 | |
| 71 | 0.5% sodium hydroxide extract of bright leaf stems | .05 | 120 | 33.1 | 3.4 | 3,120 | 5,160 | −¼ |
| 72 | do | .10 | 120 | 32.0 | 4.9 | 3,190 | 5,320 | 0 |
| 73 | None | | | 39.1 | 2.0 | 2,230 | 3,840 | |
| 74 | 1% NaOH extract bright leaf stems | .05 | 150 | 35.4 | 2.9 | 2,900 | 4,600 | 0 |
| 75 | do | .075 | 150 | 34.6 | 3.4 | 3,065 | 4,840 | −¼ |
| 76 | do | .10 | 150 | 33.8 | 4.0 | 3,080 | 4,785 | −¼ |
| 77 | do | .15 | 150 | 33.1 | 5.1 | 3,255 | 4,890 | 0 |
| 78 | None | | | 38.9 | 2.1 | 2,325 | 4,060 | |
| 79 | 1% NaOH extract bright leaf stems | .05 | 180 | 35.2 | 3.5 | 2,915 | 4,700 | −¼ |
| 80 | do | .075 | 180 | 34.8 | 3.9 | 2,985 | 4,680 | −½ |
| 81 | do | .10 | 180 | 33.5 | 5.1 | 3,145 | 4,905 | −¾ |
| 82 | do | .15 | 180 | 32.1 | 6.7 | 3,245 | 4,855 | 0 |

[1] Solids by weight of cement.
[2] A plus value indicates retardation; a negative value, acceleration.

The above data illustrate that a wide variety of acidic and alkaline extraction media and a wide range of temperatures of extraction of the principal types of tobacco stems yield agents which significantly beneficiate properties of concrete. The pattern of effects is the same as that secured by extractions with water alone, namely moderate air-entrainment, non-retarding or slight accelerating effect on rate of hardening, and significant water reduction and improvement to compressive strength of the concrete.

The examples thus far cited refer to the extraction product of the stems of tobacco plants. However, that the scope of this invention extends to other parts of the tobacco plant as well, is illustrated by the following data, which refer to evaluation of soluble extractives in concrete in precisely the same manner as is described in the above examples. Extracts made with these agents employed in the dosages indicated in Table 4 were incorporated into concrete with no further treatment such as neutralization or extraction of excess agent or other changes.

TABLE 4

| Mix No. | Additive | Percentage addition of additive [1] | Temp. of extraction, °C. | Water, gal./cu. yd. of concrete | Air, vol. percent of concrete | Compressive strength of Concrete, p.s.i. 7-day | Compressive strength of Concrete, p.s.i. 28-day | Rate of hardening relative to plain mix, hrs.[2] |
|---|---|---|---|---|---|---|---|---|
| 83 | None | | | 36.4 | 2.0 | 2,620 | 4,670 | |
| 84 | Water extract of burley stalks | .05 | 25 | 33.5 | 3.6 | 3,015 | 5,140 | −½ |
| 85 | do | .10 | 25 | 32.4 | 4.7 | 3,160 | 5,090 | −½ |
| 86 | do | .05 | 120 | 34.1 | 3.3 | 3,145 | 5,015 | −¼ |
| 87 | do | .10 | 120 | 32.5 | 4.6 | 3,085 | 5,080 | −¼ |
| 88 | None | | | 37.5 | 2.1 | 2,455 | 4,165 | |
| 89 | Water extract of burley stalks | .05 | 150 | 34.1 | 3.1 | 2,790 | 4,615 | [3] |
| 90 | do | .10 | 150 | 32.9 | 4.1 | 2,985 | 4,635 | [3] |
| 91 | None | | | 36.1 | 2.2 | 2,775 | 4,555 | |
| 92 | 1% hydrochloric acid extract of burkey stalks | .05 | 100 | 33.5 | 3.5 | 3,160 | 5,040 | −½ |

TABLE 4.—Continued

| Mix No. | Additive | Percentage addition of additive [1] | Temp. of extraction, °C. | Water, gal./cu. yd. of concrete | Air, vol. percent of concrete | Compressive strength of Concrete, p.s.i. | | Rate of hardening relative to plain mix, hrs.[2] |
|---|---|---|---|---|---|---|---|---|
| | | | | | | 7-day | 28-day | |
| 93 | do | .10 | 100 | 33.1 | 4.2 | 3,205 | 5,070 | −¼ |
| 94 | 5% hydrochloric acid extract of burley stalks. | .05 | 100 | 33.8 | 3.1 | 3,180 | 5,100 | −½ |
| 95 | do | .075 | 100 | 33.2 | 3.7 | 3,290 | 5,225 | −½ |
| 96 | None | | | 37.2 | 1.9 | 2,490 | 4,355 | |
| 97 | Water extract of commercial pipe tobacco (leaves). | .05 | 25 | 33.7 | 3.6 | 3,080 | 5,120 | −¼ |
| 98 | do | .10 | 25 | 31.8 | 5.4 | 3,385 | 5,295 | +¼ |

[1] Solids by weight of cement.
[2] A positive value indicates retardation; a negative value, acceleration.
[3] Not made.

Although tobacco plant stems are the preferred source of material to yield products within the scope of this invention, the above data indicate that other parts of the plant may also be used.

The foregoing examples refer to soluble extracts, that is, with insoluble matter removed by filtration, after the extraction. However, similar beneficial effects result if the total product containing the insoluble matter as well is employed. This is illustrated by the data below, which was obtained in the same manner as that cited above. Extracts made with these agents employed in the dosages indicated in Table 5 were incorporated into concrete with no further treatment such as neutralization or extraction of excess agent or other changes.

TABLE 5

| Mix No. | Additive | Percentage addition of additive [1] | Water, gal./cu. yd. of concrete | Air, vol. percent of concrete | Compressive strength of concrete p.s.i. | | Rate of hardening relative to plain mix, hrs.[2] |
|---|---|---|---|---|---|---|---|
| | | | | | 7-day | 28-day | |
| 99 | None | | 39.1 | 2.0 | 2,230 | 3,840 | |
| 100 | Unfiltered product from extracting tobacco stems with 1% NaOH at 150° C. | .05 | 36.3 | 2.8 | 2,795 | 4,445 | −¼ |
| 101 | None | | 38.9 | 2.1 | 2,325 | 4,060 | |
| 102 | Unfiltered product from extracting tobacco stems with 1% NaOH at 180° C. | .05 | 36.3 | 2.9 | 2,710 | 4,460 | −¼ |
| 103 | do | 0.75 | 35.4 | 3.4 | 2,895 | 4,575 | −¼ |

[1] Solids by weight of cement.
[2] A plus value indicates retardation; a minus value, acceleration.

While the soluble tobacco plant extractive is a convenient form of the present invention, the scope of this invention includes the solid, unextracted plant material as well, as is illustrated by the data below, which were obtained in the same manner as that cited above, except that the additive was untreated plant material incorporated into the concrete mixes as a solid, in any convenient state of subdivision. While stems with no prior grinding at all may be incorporated into concrete and beneficial effects realized thereby, it is apparent that in a limited mixing time for the concrete, uniform dispersion of the additive will be facilitated in the finely divided form. In the examples below, the stems were ground to pass a No. 100 mesh screen. Similar results are secured however, if the material is either more or less finely ground.

The foregoing data indicate that a wide variety of aqueous systems and conditions may be used to prepare from a wide variety of tobacco plant materials a class of extracts which together with unextracted tobacco plant material comprise the present invention in their use as integral additives to hydraulic cement mixes. Desirable effects as illustrated above may be secured by additions of these extracts in dosages ranging upward to 1 percent or more with respect to the cement, however, at these higher dosages it is sometimes necessary to use other additives for example those having an accelerating or an air-detraining effect. In the use of the unextracted material dosages up to 2 percent or more may be used sometimes also with the necessity of using other additives. It is preferred in the use of the extracts not to exceed .40 percent and with the unextracted material 1.0 percent. It is preferred to use at least .05 percent of these materials but benefits can be derived with the use of as little as .01 percent. The material of this invention is defined qualitatively as any part of the tobacco plant and any acid, alkali, or water-soluble material extracted from any tobacco plant material which when employed as an integral additive to hydraulic cement mixes will have beneficial effects on water content and compressive strength and will, in addition, entrain a useful level of air and be significantly less retarding to the rate of hardening of such mixes than prior art material. The effects which define the material of this invention are in turn quantitatively defined by the foregoing tables of data.

While the foregoing description of the invention here-

TABLE 6

| Mix No. | Additive | Percentage addition of additive [1] | Water, gal./cu. yd. of concrete | Air, vol. percent of concrete | Compressive strength of concrete p.s.i. | | Rate of hardening relative to plain mix, hrs.[2] |
|---|---|---|---|---|---|---|---|
| | | | | | 7-day | 28-day | |
| 104 | None | | 38.4 | 1.8 | 2,595 | 4,030 | |
| 105 | Untreated tobacco stems | .025 | 37.4 | 2.2 | 2,685 | 4,205 | −¼ |
| 106 | do | .05 | 36.7 | 2.4 | 2,930 | 4,460 | −¼ |
| 107 | do | .10 | 35.3 | 3.4 | 2,960 | 4,590 | −⅛ |
| 108 | do | .25 | 33.7 | 5.0 | 3,175 | 4,660 | +⅛ |
| 109 | do | .50 | 32.2 | 7.2 | 3,140 | 4,530 | +¾ |
| | | ml. ADA[3] | | | | | |
| 110 | do | .50+1 | 34.9 | 3.3 | 3,200 | 4,750 | +¾ |
| 111 | do | 1.0+1 | 34.5 | 3.6 | 3,150 | 4,895 | +6 |
| 112 | do | 2.0+2 | 34.3 | 3.4 | 2,335 | 4,410 | >+6 |

[1] Solids by weight of cement.
[2] A positive value indicates retardation; a negative value, acceleration.
[3] Tributyl phosphate used as the air-detraining agent.

in describes the use of the material of the present invention in its preferred dosage range, in mixes combined with cement, aggregate and sufficient water to effect hydraulic setting of the cement and produce a workable plastic mix, it should be understood by those skilled in the art that still other materials in the nature of additives may be included in the cement mixes for the purpose for which they are normally employed. Such other additives, for example, may be air-entraining agents, air-detraining agents, pozzuolanic materials, fly-ash, coloring materials, and water repellents. Other well-known additive materials may be used to accomplish their normal and intended function.

While the invention has been described and illustrated by reference to various specific materials and procedures, it is to be understood that the invention is not restricted to the particular materials and procedures selected for that purpose. Numerous variations in such details can be employed, as will be appreciated by those skilled in the art.

What is claimed is:

1. A hydraulic cement mix including portland cement, aggregate and having had added thereto sufficient water to effect hydraulic setting of the cement, and an additive, said additive comprising a portion of the tobacco plant, said additive being present in an amount sufficient to increase the strength of the mix when hardened.

2. A hydraulic cement mix including portland cement, aggregate and having had added thereto sufficient water to effect hydraulic setting of the cement, and an additive, said additive comprising a portion of the tobacco plant, said additive being present in an amount in the range of from 0.01% to 2.0% based upon the weight of cement.

3. A hydraulic cement mix including portland cement, aggregate and having had added therto sufficient water to effect hydraulic setting of the cement, and an additive, said additive comprising the aqueous extraction product of a portion of the cured tobacco plant, said additive being present in an amount sufficient to increase the strength of the mix when hardened.

4. A hydraulic cement mix including portland cement, aggregate and having had added thereto sufficient water to effect hydraulic setting of the cement, and an additive, said additive comprising the aqueous extraction product of a portion of the cured tobacco plant, said additive being present in an amount in the range of from 0.01% to 1.0% on a dry basis and being based upon the weight of cement.

5. A hydraulic cement mix including portland cement, aggregate and having had added thereto sufficient water to effect hydraulic setting of the cement, and an additive, said additive comprising the aqueous extraction product of a portion of the cured tobacco plant, said additive being present in an amount in the range of from 0.05% to 0.40% on a dry basis and being based upon the weight of cement.

6. A hydraulic cement mix including portland cement, aggregate and having had added thereto sufficient water to effect hydraulic setting of the cement, and an additive, said additive comprising a comminuted portion of the cured tobacco plant, said additive being present in an amount sufficient to increase the strength of the mix when hardened.

7. A hydraulic cement mix including portland cement, aggregate and having had added thereto sufficient water to effect hydraulic setting of the cement, and an additive, said additive comprising a comminuted portion of the cured tobacco plant, said additive being present in an amount in the range of from 0.01% to 2.0% based upon the weight of cement.

8. A hydraulic cement mix including portland cement, aggregate and having had added thereto sufficient water to effect hydraulic setting of the cement, and an additive, said additive comprising a comminuted portion of the cured tobacco plant, said additive being present in an amount in the range of from 0.05% to 1.0% based upon the weight of cement.

9. A hydraulic cement mix including portland cement, aggregate and having had added thereto sufficient water to effect hydraulic setting of the cement, and an additive, said additive comprising both the soluble and insoluble material resulting from the aqueous extraction treatment of a portion of the cured tobacco plant, said additive being present in an amount sufficient to increase the strength of the mix when hardened.

10. A hydraulic cement mix including portland cement, aggregate and having had added thereto sufficient water to effect hydraulic setting of the cement, and an additive, said additive comprising both the soluble and insoluble material resulting from the aqueous extraction treatment of a portion of the cured tobacco plant, said additive being present in an amount in the range of from 0.01% to 2.0% based upon the weight of cement.

11. A hydraulic cement mix including portland cement, aggregate and having had added thereto sufficient water to effect hydraulic setting of the cement, and an additive, said additive comprising the extraction product resulting from the treatment of a portion of the cured tobacco plant with an aqueous system, said aqueous system being selected from the group consisting of neutral, acidic and basic systems, said additive being present in an amount sufficient to increase the strength of the mix when hardened.

References Cited

UNITED STATES PATENTS

| | | | |
|---|---|---|---|
| 2,188,767 | 1/1940 | Cannon et al. | 106—90 |
| 2,783,122 | 2/1957 | Hoekje | 106—90 |

JAMES E. POER, *Primary Examiner.*

U.S. Cl. X.R.

106—97, 314, 315